Jan. 24, 1956  A. ZIMMERMAN  2,731,671
METHOD OF MANUFACTURING PLASTIC SLIDE FASTENERS
Filed June 6, 1951
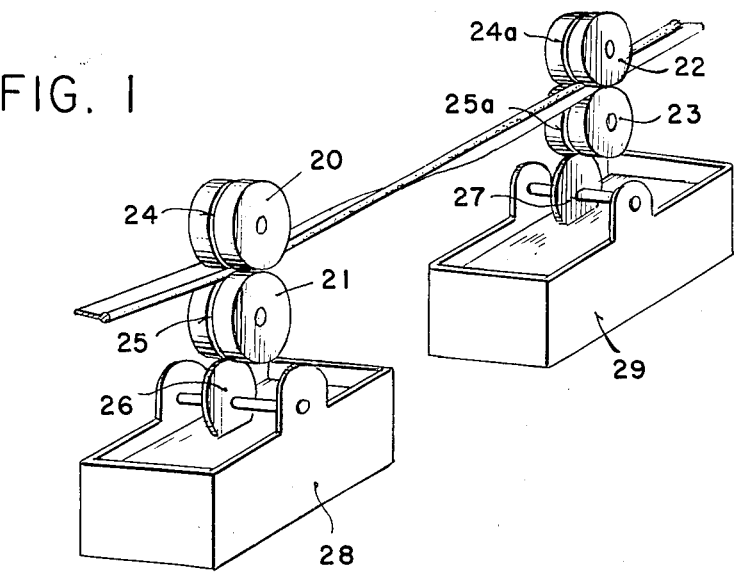
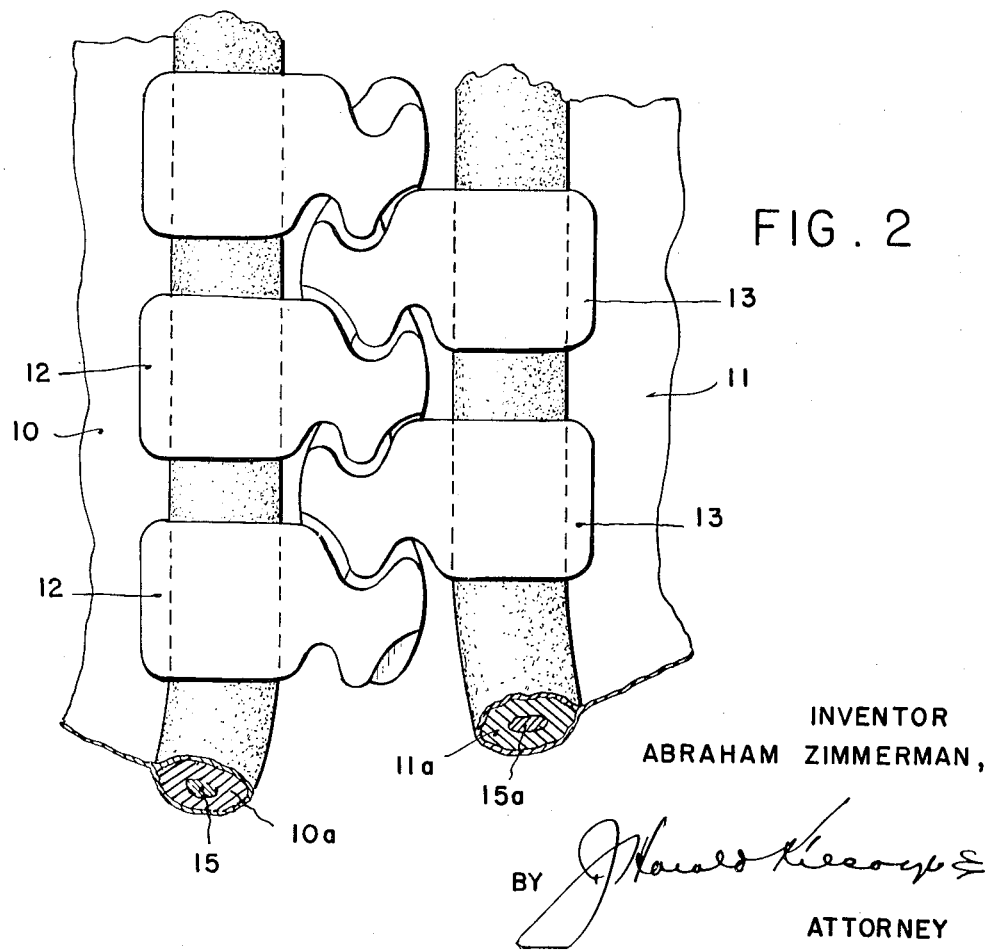
INVENTOR
ABRAHAM ZIMMERMAN,
BY
ATTORNEY

United States Patent Office 2,731,671
Patented Jan. 24, 1956

2,731,671

METHOD OF MANUFACTURING PLASTIC SLIDE FASTENERS

Abraham Zimmerman, Forest Hills, N. Y., assignor to Waldes Kohinoor, Inc., Long Island City, N. Y., a corporation of New York Application June 6, 1951, Serial No. 230,197

5 Claims. (Cl. 18—59)

This invention relates to improvements in plastic slide fasteners and to an improved method of manufacturing same.

It is well known to form the interlocking fastener elements or scoops of the so-called plastic slide fasteners from thermoplastic material in a two-part mold into which the heated semi-fluid plastic material is injected. Preferably, the elements are molded directly on to the beaded edge of the fastener tape in such manner that a complete length of fastener stringer is formed upon the completion of each molding cycle. In such a manufacturing process, a fastener tape with its beaded reinforcing edge is intermittently advanced through the two-part mold so that at least the portion of the tape within the mold lies in a plane cutting through the facing cavities of the mold parts into which the plastic material is to be injected. Between the intervals of the feed motion of the tape, the mold is closed and the heated thermoplastic material, for example nylon, is injected into the mold cavities in such manner that the material is cast about the bead of the tape in the form of legs or jaws by which the elements affix themselves to the tape.

Experience has shown, however, that the holding force of plastic fastener elements on the bead on their carrying tape does not equal the holding force exerted by the metal elements of conventional metal slide fasteners for which in certain applications the plastic slide fastener is intended to provide a successful substitute. The lesser holding force of the plastic elements, particularly at both the upper and lower ends of the fastener where in rough service the elements are called upon to withstand severe forces resulting from side pull exerted on their tape, represents a feature of disadvantage of the plastic slide fastener. Moreover, when it is considered that plastic slide fasteners are frequently used in corsets, girdles and similar garments, which are often worn under great strain, and that loosening or giving away of a single element may render the fastener useless, the lesser holding power of the plastic fastener element on bead represents a marked drawback of plastic slide fasteners as compared to conventional metal slide fasteners.

Stated generally, it is the object of the present invention to eliminate the aforesaid objections of the plastic slide-fastener through the provision of a connection between the plastic elements and tape bead by which not only are the elements more strongly affixed to their bead than heretofore, but also of a connection that is even stronger than the bead itself, thus giving a holding power of plastic element on bead which for all practical purposes is unlimited. More specifically, the invention aims to provide a bond between the plastic elements of a plastic slide fastener and the tape bead on which they are mounted which will form a practically inseparable connection therebetween upon solidification of the thermoplastic material constituting the elements within the mold.

A further object of the invention resides in the provision of a bonding material for providing a secure connection between thermoplastic fastener elements and their tape bead, in the nature of a thermosetting resin which may be readily applied to the tape bead, preferably prior to its being positioned in the mold, and whose curing time is especially favorable as respects the temperature at which the thermoplastic material for the elements is injected in the mold and the cooling period thereof, with the result that without any delay in the molding process and by the normal use of the heat of the material injected into the mold, the thermosetting resin is cured, i. e. undergoes a structural change giving a rigid connection between elements and bead upon cooling of the thermoplastic material in the mold.

Yet another object of the invention is the provision of a bond between the plastic fastener elements and the tape bead of a plastic slide fastener resulting from the application of a thermosetting resin to the bead prior to the introduction of the tape into the mold and which has the additional function of serving as a plasticizer for the thermoplastic material for the elements by which the thermoplastic material is more quickly and evenly distributed about the tape bead. The use of a thermosetting bonding material which also functions as a plasticizer as aforesaid is of special advantage for use with tape beads employing an insert of thermoplastic material such as nylon in that it aids in causing the thermoplastic material of the insert to more readily permeate the body of the tape bead, so that upon cooling there results a substantially integral connection between the plastic elements and the tape bead.

A still further object of the invention is the provision of a method of manufacturing plastic slide fasteners, the practice of which results in securement of the plastic fastener elements to the bead of their tape with a practically unlimited holding force.

The above and other objects and advantages of the invention will be seen from the following detailed description, taken with the accompanying drawing, in which:

Fig. 1 is a schematic view of one means for applying a thermosetting bonding material to the bead of a tape prior to the molding of the plastic fastener elements thereon according to the invention; and Fig. 2 is a plan view of a length of plastic slide fastener resulting from the practice of the invention.

In the drawings, reference being had to Fig. 2, the reference numerals 10 and 11 designate the fabric tapes of a so-called plastic slide fastener, the interlocking fastener elements 12, 13 of which have been cast directly on to the tape beads 10a, 11a, respectively, preferably in a two-part mold. In such a manufacturing process, each tape is fed into its two-part mold in such manner that it lies in a plane which, upon closing of the mold, cuts through the element-forming cavities thereof and that the tape bead extends a short distance into said cavities. Thereupon the mold is closed and thermoplastic material, such as nylon, is injected into the mold at a temperature of about 500° F., with the result that the plastic elements are cast directly on to the tape beads, forming conventional jaws extending about the tape bead by which the elements are affixed to the tape, all as well known in the art.

As explained above, the holding force exerted by plastic elements on their tape bead is less than that of corresponding elements made of metal as employed in conventional metal slide fasteners for which the plastic slide fastener is intended to provide a successful substitute. This relatively lesser holding power of plastic elements gives rise to objections to the use of plastic slide fasteners in those applications in which they are particularly suitable, i. e. foundation garments and like apparel worn next to the skin.

It is a purpose of the present invention to overcome the aforesaid disadvantages of the plastic slide fastener through the provision of a bond or connection between the thermoplastic elements and their tape bead, and the method of obtaining such a bond, by which the holding force capable of being exerted by the plastic element on its bead is not only substantially greater than heretofore possible, but also one that is even stronger than the bead itself and hence one that for all practical purposes possesses unlimited holding power.

The aforesaid desirable results are achieved according to the invention by applying to the bead, as by impregnating or coating the same prior to the molding of the thermoplastic fastener elements thereon, and preferably prior to the tape being fed to the mold, a bonding material having such an affinity to the thermoplastic material of the elements that when the latter solidifies in the mold there is formed a practically inseparable connection between the formed plastic elements and the tape bead. One such bonding material suitable for the purposes of the invention is a thermosetting resin such as phenol formaldehyde or resorcinol formaldehyde resin, or a mixture of both. The special adaptability of such a bonding material becomes apparent when it is considered that the thermoplastic material for forming the elements is injected into the mold under considerable heat which, in the case of nylon, is about 500° F. This temperature is especially favorable to the use of a thermosetting resin as a bonding material since the curing period thereof is in inverse proportion to the temperature to which the resin is exposed. Thus, under a temperature of the thermoplastic material as low as 250° F., the curing period of the thermosetting resin remains very short, so that even with the lower injection temperature no delay occurs in the molding process. Under the influence of the heat transferred to it by the injected thermoplastic material, the thermosetting resin undergoes a structural change, giving a rigid connection between the formed thermoplastic elements and the tape bead.

The use of a phenol formaldehyde resin as a bonding material is also of advantage in that it acts as a plasticizer for the injected thermoplastic material which, as a consequence, is more quickly and evenly distributed over and about the tape bead. It will be understood, however, that other thermosetting bonding materials may be employed to advantage, such as resorcinol formaldehyde mentioned above, urea formaldehyde, melamine formaldehyde, the polyesters, the alkyds, and so on.

I have also found that thermosetting resins as above having plasticizing properties are particularly suited for use as the bonding material for tapes whose bead is reinforced by a thermoplastic insert such as indicated by the reference numerals 15, 15a (Fig. 2) which designate such a thermoplastic resinforcing insert contained within both beads 10a, 11a of the tapes herein shown. When acted upon by the thermosetting resin, the thermoplastic bead insert is rendered plastic by the heat of the injected thermoplastic material and accordingly more readily intermixes with the body of the tape bead, with the result that upon cooling of the thermoplastic material constituting the fastener elements a substantially integral connection between the elements and tape bead is achieved.

Thermosetting resins of the category outlined above are commercially available in a liquid or semi-liquid state, for example, as an alcohol-water solution. Since such resins are inert, neither the tape nor the thermoplastic elements bonded thereto is effected in any detrimental way by their use as a bonding material.

Fig. 1 diagrammatically illustrates one possible means for applying the thermosetting bonding material to the tape bead according to the invention. Illustratively, such means comprises spaced pairs of contacting rollers 20, 21 and 22, 23 turning on parallel shafts, at least one roller of each pair being powered by suitable means (not shown). The rollers of the pairs are provided intermediate their ends with facing grooves 24, 25, 24a, 25a dimensioned to correspond to the section of the bead of a fastener tape whose web portion is drawn through the throat of each pair of rollers upon their rotation, it being observed that the spacing of the roller pairs is such that an appreciable length of tape extends between them. The lower rollers 21, 23 of the pairs thereof are disposed in driving contact with dip rolls 26, 27, the upper peripheral portions of which enter the roller grooves 25, 25a and the lower peripheral portions of which dip into thermosetting material contained in the fountain reservoirs 28, 29, from which the dip rolls are supported for rotation as shown.

As will be understood from the foregoing, the dip rolls 26, 27 apply a coating of the thermosetting resin to the surfaces of the grooves 25, 25a of the lower rollers 21, 23 which is applied to the under side of the tape bead as the tape is drawn through the advance pair of rollers 20, 21 and by twisting the tape intermediate the roller pairs to the upper side of the bead of the tape as the latter is drawn through the second or following pair of rollers 22, 23.

Following application of the thermosetting resin to the tape bead as aforesaid, the so prepared tape may be reeled over a drum, on which it is exposed to atmosphere for a period of about 5–15 min., allowing some of the solvent to evaporate. This short holding period renders the impregnated bead less tacky and hence more suitable to being fed through the mold. Alternatively, the so prepared tape may be stored under a temperature low enough to preclude setting until ready for use.

It will be understood that means for coating or impregnating the tape with the thermosetting resin other than that illustrated may be employed; for example, the tape may be drawn over a brush or brushes shaped to apply the thermosetting resin only to the bead portion of the tape, or the tape may be guided over rolls permitting its beaded edge to be dipped into a fountain containing a body of the thermosetting resin.

Without further analysis, it will be seen that the invention provides an exceedingly simple solution of the problem heretofore encountered in so-called plastic slide fasteners of the plastic elements having less than the required holding force on their tape beads. As pointed out above, not only does the invention result in the plastic elements being secured to the tape beads with a holding force which is substantially greater than that heretofore obtainable, but also with a holding force that is so great that under excessive strain the tape will give away instead of the connection between elements and tape beads, with the result that a holding power is achieved which for all practical purposes is substantially unlimited.

The aforesaid method of manufacturing plastic slide fasteners whose plastic elements have substantially unlimited holding power on their tape beads is relatively simple in practice since it requires merely the application of a suitable thermosetting resin to the bead portion of a tape, preferably prior to its being fed into the mold, it being a feature of the invention that the so-applied thermosetting resin partakes of its structural change giving the desirable strong bond between the plastic elements and their bead under the heat given up by the thermoplastic material injected into the mold. The use of a thermosetting resin acting as a plasticizer for the thermoplastic material, such as nylon, also results in the thermoplastic material introduced into the mold being more quickly and evenly distributed about the tape bead. Where the tape employed is of the type having a thermoplastic reinforcing insert, the thermosetting resin functioning as a plasticizer also causes the thermoplastic insert, when rendered plastic by the heat of the injected thermoplastic material, to more readily permeate the body of the bead, thus to give upon cooling of the thermoplastic elements in the mold a substantially integral connection between elements and the thermoplastic material of the insert as distributed throughout the body of the bead.

As many changes could be made in carrying out the

I claim:

1. The method of manufacturing a slide fastener having fastener elements of thermoplastic material cast on to the bead of the fastener tape, comprising the steps of applying to the bead of said fastener tape prior to its introduction into a mold employed in the casting operation, a thermosetting resin having the property of curing at the temperature at which the thermoplastic material for the fastener elements is supplied to the mold and within approximately the time required for said molding operation, and when cured of bonding the elements to the tape with a strength exceeding that of the thermoplastic material of said elements, positioning the tape in the mold in such manner that the bead projects into the cavities of the mold in which the fastener elements are formed, injecting heated thermoplastic material into the mold cavities thereby to cast the elements about the tape bead, and curing the thermosetting material in the mold under the influence of the heat of the injected thermoplastic material.

2. The method of manufacturing a slide fastener as set forth in claim 1, wherein the thermosetting resin is applied as a coating on the tape bead.

3. The method of manufacturing a slide fastener having fastener elements of thermoplastic material cast on to the bead of the fastener tape, comprising the steps of coating the tape bead prior to the introduction of the fastener tape into a mold employed in the casting operation with a phenolic formaldehyde resin having the property of curing at the temperature at which the thermoplastic material for the fastener elements is supplied to the mold and within approximately the time required for said molding operation, and when cured of bonding the fastener elements to the tape with a strength exceeding that of the thermoplastic material of said elements, positioning the tape in the mold in such manner that the bead projects into the cavities of the mold provided for forming the elements, injecting heated thermoplastic material into the mold cavities thereby to cast the elements around the tape bead, and simultaneously therewith curing the phenolic formaldehyde resin under the influence of the heat of the injected thermoplastic material.

4. The method of manufacturing a slide fastener having fastener elements of thermoplastic material cast on to the bead of the fastener tape, comprising the steps of coating the tape bead prior to the introduction of the fastener tape into a mold employed in the casting operation with a bonding material containing a phenolic formaldehyde resin having the property of curing at the temperature at which the thermoplastic material for the fastener elements is supplied to the mold and within approximately the time required for said molding operation, and when cured of bonding the fastener elements to the tape with a strength exceeding that of the thermoplastic material of said elements, positioning the tape in the mold in such manner that the bead projects into the cavities of the mold provided for forming the elements, injecting heated thermoplastic material into the mold cavities thereby to cast the elements around the tape bead, and simultaneously therewith curing the phenolic formaldehyde resin under the influence of the heat of the injected thermoplastic material.

5. The method of manufacturing a slide fastener having fastener elements of thermoplastic material cast on to the bead of the fastener tape, comprising the steps of providing the tape bead with a reinforcing insert of said thermoplastic material, coating said bead prior to the introduction of the fastener tape into a mold employed in the casting operation with a thermosetting resin selected for its property of plasticizing said thermoplastic material and further of curing at the temperature at which said thermoplastic material for the fastener elements is supplied to the mold and within approximately the time required for said molding operation, and when so cured of bonding said fastener elements to the tape with a strength exceeding that of the thermoplastic material of said elements, positioning the tape in a mold in such manner that the coated bead projects into the mold cavities provided for the formation of the fastener elements, injecting heated thermoplastic material into the mold cavities thereby to cast the fastener elements about the tape bead, and simultaneously therewith effecting distribution of the thermoplastic material of the reinforcing insert and curing of the thermosetting material of the bead coating under the influence of the heat of the injected thermoplastic material.

References Cited in the file of this patent

UNITED STATES PATENTS

| 1,920,138 | Corner | July 25, 1933 |
| 2,082,619 | Dau | June 1, 1937 |
| 2,095,209 | Brownsdon | Oct. 5, 1937 |
| 2,144,591 | Bux et al. | Jan. 17, 1939 |
| 2,170,421 | Morin et al. | Aug. 22, 1939 |
| 2,174,159 | Marinsky | Sept. 26, 1939 |
| 2,269,880 | Morin et al. | Jan. 13, 1942 |

FOREIGN PATENTS

| 391,146 | Great Britain | of 1933 |
| 400,958 | Great Britain | Nov. 3, 1933 |